United States Patent [19]

Tuckey

[11] 4,432,659
[45] Feb. 21, 1984

[54] FUEL PUMP ARMATURE SHAFT BEARING

[75] Inventor: Charles H. Tuckey, Cass City, Mich.

[73] Assignee: Walbro Corporation, Cass City, Mich.

[21] Appl. No.: 357,690

[22] Filed: Mar. 12, 1982

[51] Int. Cl.³ .................. F16C 33/02; F16C 35/02; F16C 33/20

[52] U.S. Cl. .................................. 384/300; 384/295; 384/438

[58] Field of Search ............... 384/129, 276, 297, 295, 384/300, 428, 438, 439, 441, 264, 259

[56] References Cited

U.S. PATENT DOCUMENTS

| | | | |
|---|---|---|---|
| 82,790 | 10/1868 | Blake | 384/295 |
| 1,254,909 | 1/1918 | Howe | 384/286 |
| 2,535,037 | 12/1950 | Bryant | 384/438 X |
| 2,828,985 | 4/1958 | Ridenour | 384/129 X |
| 3,570,120 | 3/1971 | Adams et al. | 384/297 X |
| 4,207,033 | 6/1980 | Drutchas et al. | 417/410 X |

FOREIGN PATENT DOCUMENTS 2406658  9/1974  Fed. Rep. of Germany ...... 384/295

Primary Examiner—Stuart S. Levy
Assistant Examiner—Thomas R. Hannon
Attorney, Agent, or Firm—Barnes, Kisselle, Raisch, Choate, Whittemore & Hulbert

[57] ABSTRACT

A cylindrical Teflon bearing insert for a rotating shaft is molded into a fuel pump end housing with a hexagonal inside diameter and outside diameter recess to provide flat bearing surfaces for a shaft and a mechanical interlock in the end housing. A longitudinal variance in diametric dimensions provides effective shaft contact.

1 Claim, 6 Drawing Figures

FUEL PUMP ARMATURE SHAFT BEARING

FIELD OF INVENTION

Electrically operated fuel pumps utilizing a rotary pump on axis with a motor armature, the pump and armature being mounted on a common shaft.

BACKGROUND OF INVENTION

In rotary fuel pumps driven by an electric motor, it is common to have a motor armature shaft which mounts the armature for rotation. The armature drives a coaxial pump element which is suitably mounted in a surrounding housing. Since these housings are frequently formed of a molded plastic, the journal of bearing for the pump shaft has been in a recess molded into the housing. The problem of a shaft lubrication and support has been approached by making the shaft recess with a polygonal shape, hexagonal or octagonal, the flats of the polygon being in bearing contact with the rotating shaft. This has provided some room for alignment compensation but utilizing the housing material for a bearing has not been entirely successful.

The plastic of the molded end of a pump which has provided the bearing is a glass reinforced thermoplastic polyester. The dimensions of the polygonal hole, for example, hexagonal, has had to be controlled very closely. It is impossible to have an interference fit since this would bind and seize the shaft; if the fit is loose, the pump will produce unacceptable noise. Also, if the pump runs dry of fuel, it will seize up in only two or three minutes.

Some pump designs have utilized brass or sintered bronze bearings molded into a plastic but these bearings have to be lubricated and cannot be run dry.

The present invention contemplates a bearing construction which will have a long life, run quietly, and yet provide the necessary compensation movement for suitable alignment. It is a further object to provide a bearing insert which has an interlock with the main pump end housing and which is shaped to provide an ideal bearing surface.

Other objects and features of the invention will be apparent in the following description and claims in which the invention is set forth together with details to facilitate use of the invention by persons skilled in the art.

BRIEF DESCRIPTION OF THE DRAWINGS:

Drawings accompany the disclosure and the various views thereof may be briefly described as.

DETAILED DESCRIPTION OF THE INVENTION AND THE MANNER AND PROCESS OF USING IT

Figure 1:
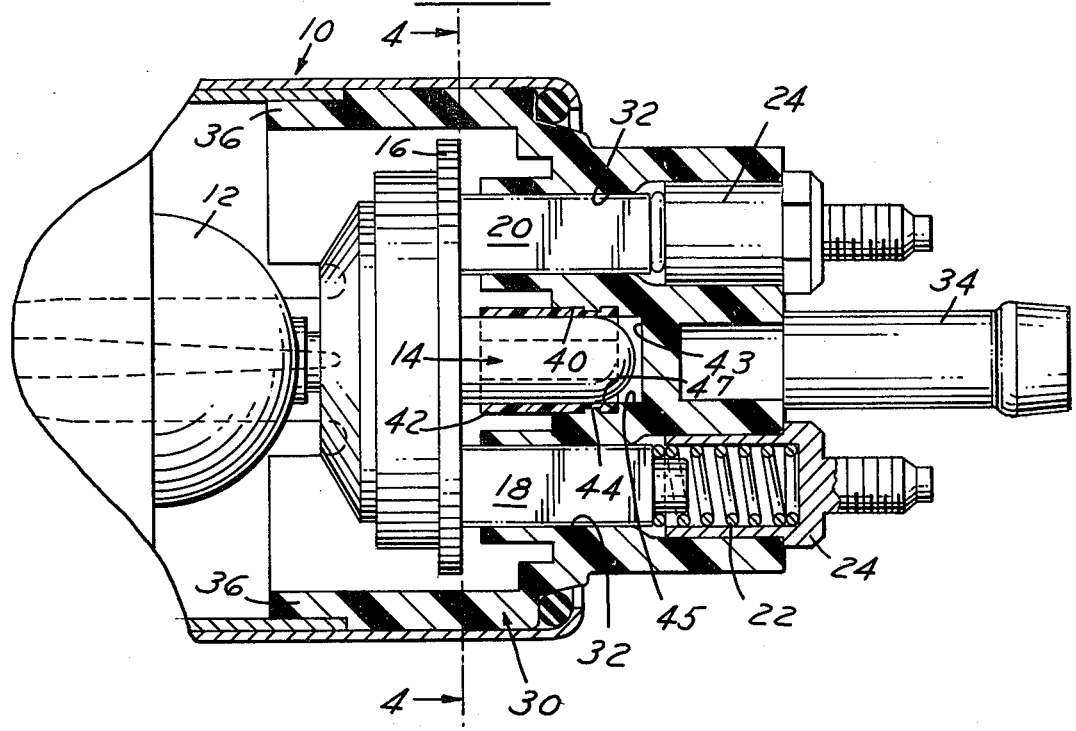
FIG. 1, a partial view of an electric fuel pump in section showing the shaft bearing.

With reference to the drawings, in FIG. 1, there is shown in cross-section the discharge end of a fuel pump 10 driven by an armature 12 mounted on a rotating shaft 14. A brush plate 16 is contacted by brushes 18, 20 backed by springs 22 seated in connector thimbles 24. Reference is made to my copending United States patent application, Ser. No. 228,346, filed Jan. 26, 1981, for details of the entire pump construction.

The discharge end housing 30 of the pump is a molded plastic element with suitable recesses for the described parts. In the sectional view, FIG. 4, the recesses 32 receive the brushes 18 and 20 and a pump outlet recess 33 opens to a connection nipple 34 projecting from the end housing. Molded projections 36 extend axially to support suitable arcuate magnets which, with the armature, form an electric motor.

A central recess 40 (FIGS. 1 and 4) carries a bearing sleeve 42 formed of a suitable plastic such as a virgin polytetrafluorethylene (PTFE) plastic. About half of the length of the insert 42 is positioned in the recess 40 while the remainder projects outwardly toward the brush plate 46.

Figure 2:
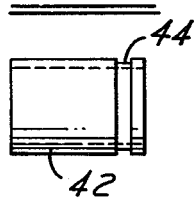
FIG. 2, an elevation of a bearing insert.
Figure 3:
FIG. 3, an end view of a bearing insert.
Figure 5:
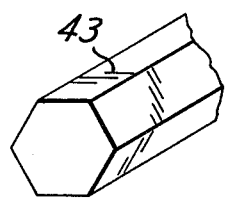
FIG. 5, an end view of a core pin used in the molding process.

In forming the end housing 30, the cylindrical insert 42, shown in FIGS. 2 and 3, is placed on a suitable core pin 43 in the mold used in making the part 30. The core pin, which has a hexagonal section, is shown in FIG. 5. The insert 42 has an annular groove 44 which locks in to the body plastic during the molding process. In the present invention, the hexagonal core pin 43 is inserted into the cylindrical insert 42 and this will somewhat distort the insert into a hexagonal shape.

Figure 4:
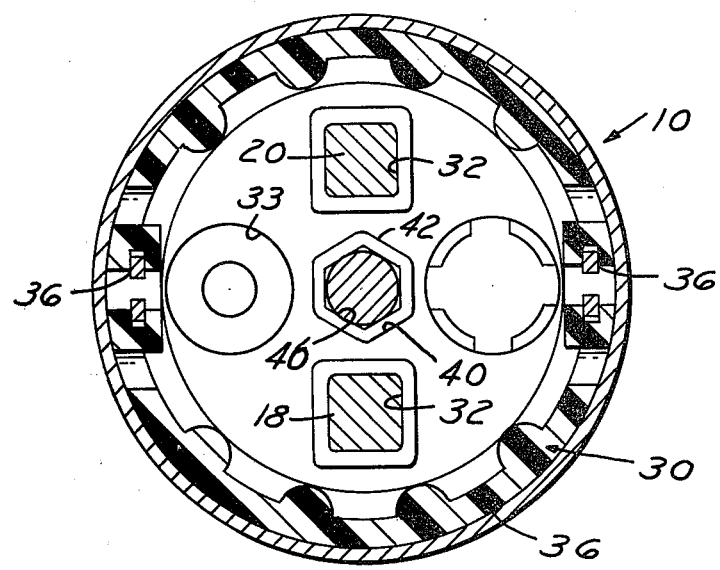
FIG. 4, a section on line 4—4 of FIG. 1.

The inside diameter (ID) of the sleeve 42 prior to molding is preferably about 0.005" larger than the dimension of the hexagonal core pin across the flats. The core pin 43 extends into the body beyond the end of the insert to form the clearance recess 45 which accommodates the end of the armature shaft 14. The plastic used for the insert 42 as previously described is a Teflon (PTFE). The end shell is molded around the Teflon and into the groove 44 such that the insert is locked against axial dislodgement. It seats at the inner end against a shoulder 47. The insert recess 46, as illustrated in FIG. 4, after molding, is hexagonal in conformity to the core pin because of the heat and pressure of the molding process. However, the outside of the insert 42, after being molded into the end housing, is generally hexagonal but slightly rounded as shown in FIG. 4. Nevertheless, the outside of the molded-in insert is out-of-round to a sufficient degree that it is locked against rotation.

Figure 6:
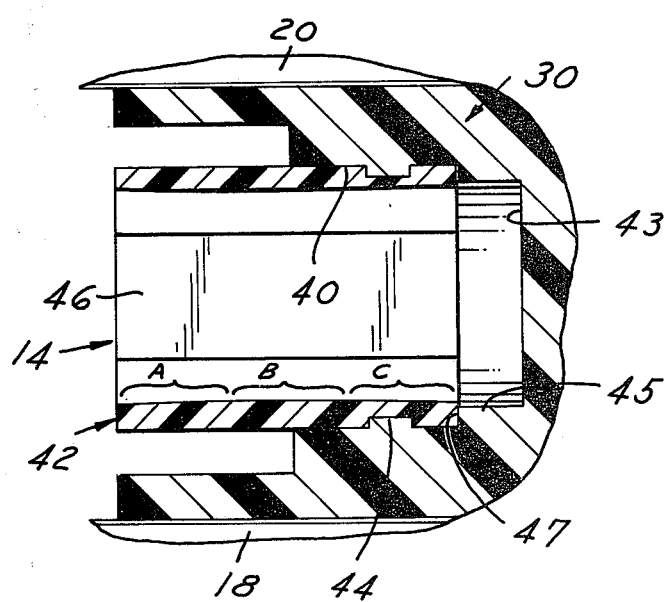
FIG. 6, an enlarged view of the insert after molding.

Subsequent to the molding of the insert into the end housing 10, there is an axial variation in the diametrical dimensions of the sleeve or insert 42. As shown in the enlarged FIG. 6, the outer end A of the hexagonal recess of the insert is slightly oversize since it will not have been compressed in the molding operation and it started slightly oversize. At the area designated B, the diameter is just about exactly that of the core pin and also of the shaft 14 which will be running in the insert. In the area C, there is a shrinkage that takes place in the body 30 after the molding process is complete and the diameter at this area becomes slightly oversize. Thus, there is somewhat of an hour glass shape in the completed insert.

In the completed product, the shaft 14 can initially have even a force fit in the insert at the area B but the Teflon has a flow characteristic which allows it to yield in use and after a brief run-in there will be a perfect fit. The bearing will run dry indefinitely if for some reason fuel is not passing through the pump so lubrication is not a problem. The virgin Teflon becomes self-conformed to the shaft. The hexagonal opening in the insert leaves some room for a cold flow and allows the bearing to conform while retaining a tight fit.

A further advantage lies in the final shape of the insert recess which allows slight run-out of the shaft and compensation for possible misalignment. The shaft will cock slightly in the insert without interfering with the smooth and quiet operation.

What is claimed is:

1. In a device having a rotating shaft journalled at one end in a molded plastic portion of a housing, that improvement which comprises a hollow cylindrical bearing insert molded into a recess in said housing and formed of a plastic such as polytetrafluorethylene, said insert having a close running fit with said rotating shaft and shaped internally and externally with a polygonal configuration, the sides of the internal polygon being in running contact with said shaft and the sides of the external polygon being in mechanical engagement with said housing, said insert having a substantial portion of its outer end extending axially out of said recess to the extent of about one-half the axial length, and said insert having a larger diameter at its outer end beyond said recess and at the inner end within said recess in comparison to a smaller diameter at a central section in the area of the mouth of said recess.

* * * * *